US009097541B2

(12) United States Patent
Bando et al.

(10) Patent No.: US 9,097,541 B2
(45) Date of Patent: Aug. 4, 2015

(54) DRIVING SUPPORT DEVICE

(75) Inventors: Mikio Bando, Mito (JP); Yukihiro Kawamata, Hitachi (JP); Toshiyuki Aoki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 74 days.

(21) Appl. No.: 13/991,995

(22) PCT Filed: Dec. 6, 2011

(86) PCT No.: PCT/JP2011/078140
§ 371 (c)(1),
(2), (4) Date: Jun. 6, 2013

(87) PCT Pub. No.: WO2012/086401
PCT Pub. Date: Jun. 28, 2012

(65) Prior Publication Data
US 2013/0261921 A1    Oct. 3, 2013

(30) Foreign Application Priority Data

Dec. 24, 2010  (JP) .................................. 2010-286924

(51) Int. Cl.
*G01C 21/26* (2006.01)
*G01C 21/28* (2006.01)
*G08G 1/16* (2006.01)
*G01C 21/16* (2006.01)
*G01C 25/00* (2006.01)

(52) U.S. Cl.
CPC .............. *G01C 21/26* (2013.01); *G01C 21/165* (2013.01); *G01C 21/28* (2013.01); *G01C 25/005* (2013.01); *G08G 1/16* (2013.01)

(58) Field of Classification Search
None
See application file for complete search history.

(56) References Cited

U.S. PATENT DOCUMENTS

2008/0088707 A1*  4/2008  Iwaki et al. ................. 348/208.1
2010/0082195 A1*  4/2010  Lee et al. ......................... 701/25

FOREIGN PATENT DOCUMENTS

| JP | 8-50699 A | 2/1996 |
|---|---|---|
| JP | 2000-97714 A | 4/2000 |
| JP | 2002-274301 A | 9/2002 |
| JP | 2003-75172 A | 3/2003 |
| JP | 2006-160116 A | 6/2006 |
| JP | 2008-70999 A | 3/2008 |

(Continued)

OTHER PUBLICATIONS

International Search Report dated Mar. 19, 2012 with English translation (Four (4) pages).

*Primary Examiner* — John R Olszewski
*Assistant Examiner* — Gerrad A Foster
(74) *Attorney, Agent, or Firm* — Crowell & Moring LLP

(57) ABSTRACT

A driving support device includes a maximum measurement range determination unit adapted to calculate a distance to a plurality of points on a surface of an object present at surroundings of a vehicle. A distance sensor such as a laser range finder or a stereo camera that measures a distance is used in order to estimate bias of an acceleration sensor with high accuracy upon correction of the bias by use of the distance sensor such as the stereo camera or the LRF in a GPS non-receiving section. A sensor parameter estimation unit is adapted to estimate a parameter of the acceleration sensor based on a behavior of an own vehicle obtained from a vehicle translation and rotation angle calculation means adapted to count backwards the vehicle behavior based on distance variation and also based on a measurement value of the acceleration sensor.

9 Claims, 8 Drawing Sheets

(56) References Cited

FOREIGN PATENT DOCUMENTS

| | | | |
|---|---|---|---|
| JP | 2008-82932 A | 4/2008 |
| JP | 2008-175721 A | 7/2008 |
| JP | 2009-281799 A | 12/2009 |
| JP | 2009-300457 A | 12/2009 |
| JP | 2010-162975 A | 7/2010 |

* cited by examiner

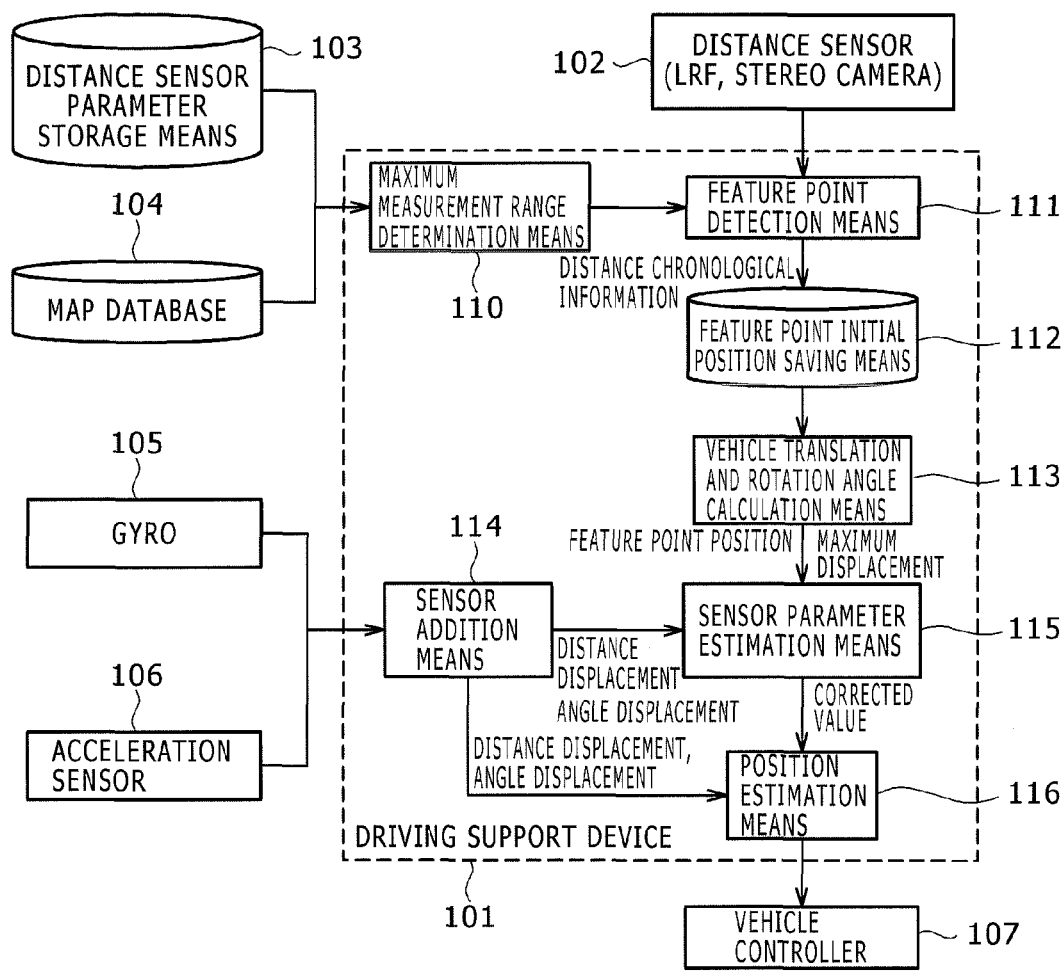

FIG. 4

| | |
|---|---|
| PARAMETER CHANGE FLAG | ~ 401 |
| ATTACHMENT ANGLE (ROLL ANGLE) | ~ 402 |
| ATTACHMENT ANGLE (PITCH ANGLE) | ~ 403 |
| ATTACHMENT ANGLE (YAW ANGLE) | ~ 404 |
| ATTACHMENT POSITION (HORIZONTAL SHIFT AMOUNT) | ~ 405 |
| ATTACHMENT POSITION (HEIGHT FROM GROUND SURFACE) | ~ 406 |
| MEASUREMENT ACCURACY RESOLUTION (DEPTH DIRECTION) | ~ 407 |
| MEASUREMENT ACCURACY RESOLUTION (HORIZONTAL DIRECTION) | ~ 408 |
| MEASUREMENT ACCURACY RESOLUTION (HEIGHT DIRECTION) | ~ 409 |
| MEASUREMENT RANGE (DEPTH DIRECTION) | ~ 410 |
| MEASUREMENT RANGE (HORIZONTAL DIRECTION) | ~ 411 |
| MEASUREMENT RANGE (HEIGHT DIRECTION) | ~ 412 |

FIG. 5

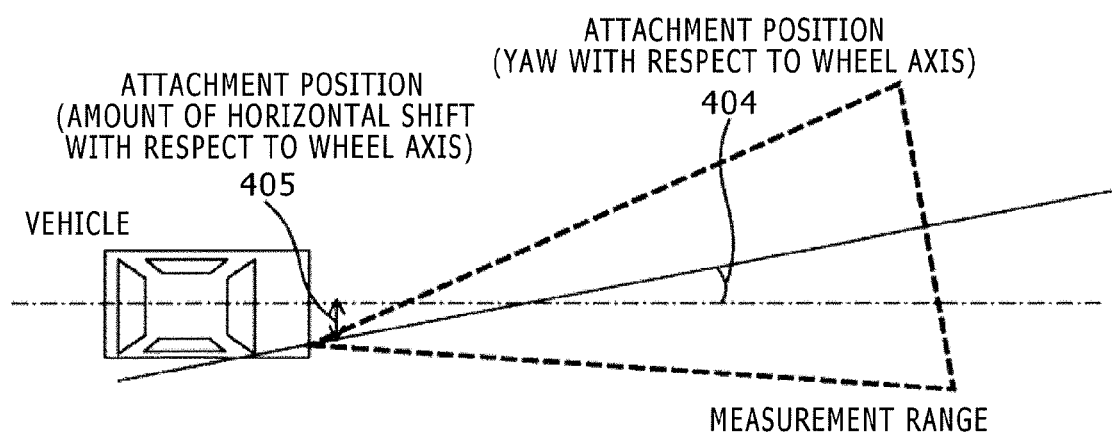

DRIVING SUPPORT DEVICE

TECHNICAL FIELD

The present invention relates to a system performing vehicle control and a device supporting vehicle driving.

BACKGROUND ART

With a method called dead-reckoning navigation used for vehicle position estimation, the vehicle position is estimated by sequentially adding a traveling direction and a speed of the vehicle, which are calculated based on a value of measurement by an inertial sensor such as a gyro or an acceleration sensor. With this dead-reckoning navigation, position estimation difference is gradually cumulated, and thus measurement accuracy of the gyro or the acceleration sensor is very important, which requires calibration of these inertial sensors and estimated position correction.

Conventionally, there has been a method of calibrating bias of the acceleration sensor, bias of the gyro, or a scale factor by using a measurement value from a sensor that directly measures a shift amount of a GPS or a vehicle (Patent Literature 1, Patent Literature 2, and Patent Literature 6). However, the sensor calibration by the GPS can no longer be used in, for example, a case where a GPS signal cannot be taken in, for example, indoors or a multi-path frequently occurring area or a case where accuracy of positioning by the GPS deteriorates. Under such circumstances, the gyro may be corrected by using, instead of the GPS, a distance sensor such as a laser range finder (LRF) or a stereo camera that measures a distance to an object at surroundings. Described in Patent Literature 3 is a method of estimating a vehicle behavior by using an LRF or a stereo camera. Moreover, described in Patent Literature 4 is a method of correcting gyro by extracting a feature point of a white line by a camera. Moreover, described in Patent Literature 5 is a technology of correcting an own vehicle position directly from an object at surroundings of a current position.

Using these technologies makes it possible to perform the position correction and correction of the bias of the sensor such as the gyro and the scale factor by the distance sensor such as the LRF or the stereo camera.

CITATION LIST

Patent Literatures

Patent Literature 1: Japanese Unexamined Patent Application Publication No. 2003-75172
Patent Literature 2: Japanese Unexamined Patent Application Publication No. 2008-175721
Patent Literature 3: Japanese Unexamined Patent Application Publication No. 2006-160116
Patent Literature 4: Japanese Unexamined Patent Application Publication No. 2008-82932
Patent Literature 5: Japanese Unexamined Patent Application Publication No. 2000-97714
Patent Literature 6 Japanese Unexamined Patent Application Publication No. 2009-281799

SUMMARY OF INVENTION

However, even if an attempt to correct the acceleration sensor in the same manner as the gyro correction by using the distance sensor such as the camera or the LRF is made, vehicle acceleration, inclination of vehicle body posture, etc. affect a value of the acceleration sensor, and further changes in vehicle body posture such as a pitch angle and a roll angle greatly affect measurement accuracy of the camera and the LRF, which therefore leads to failure to correct the bias of the acceleration sensor with high accuracy.

Technical Problem

In the present invention, bias of an acceleration sensor is estimated by: a distance sensor measuring a distance to an object present at surroundings of a vehicle; a vehicle translation and rotation angle calculation means adapted to obtain a vehicle behavior based on variation in the distance to the object measured by the distance sensor; and a sensor parameter estimation means adapted to estimate a parameter of a speed sensor based on the vehicle behavior obtained from the vehicle translation and rotation angle calculation means and a value of measurement by the acceleration sensor.

Advantageous Effects of Invention

Bias of an acceleration sensor can be estimated with high accuracy based on a value of a distance sensor.

Other objects, features, and advantages of the present invention will be clarified from description of embodiments of the invention below related to the accompanying drawings.

BRIEF DESCRIPTION OF DRAWINGS

FIG. 1 is a diagram showing configuration of a vehicle control system provided with a driving support device according to the present invention.

FIG. 2 is a diagram showing data configuration of distance chronological information.

FIG. 4 is a diagram showing data structure of distance sensor parameters.

FIG. 5 is a diagram illustrating the distance sensor parameters.

DESCRIPTION OF EMBODIMENTS

Figure 3:
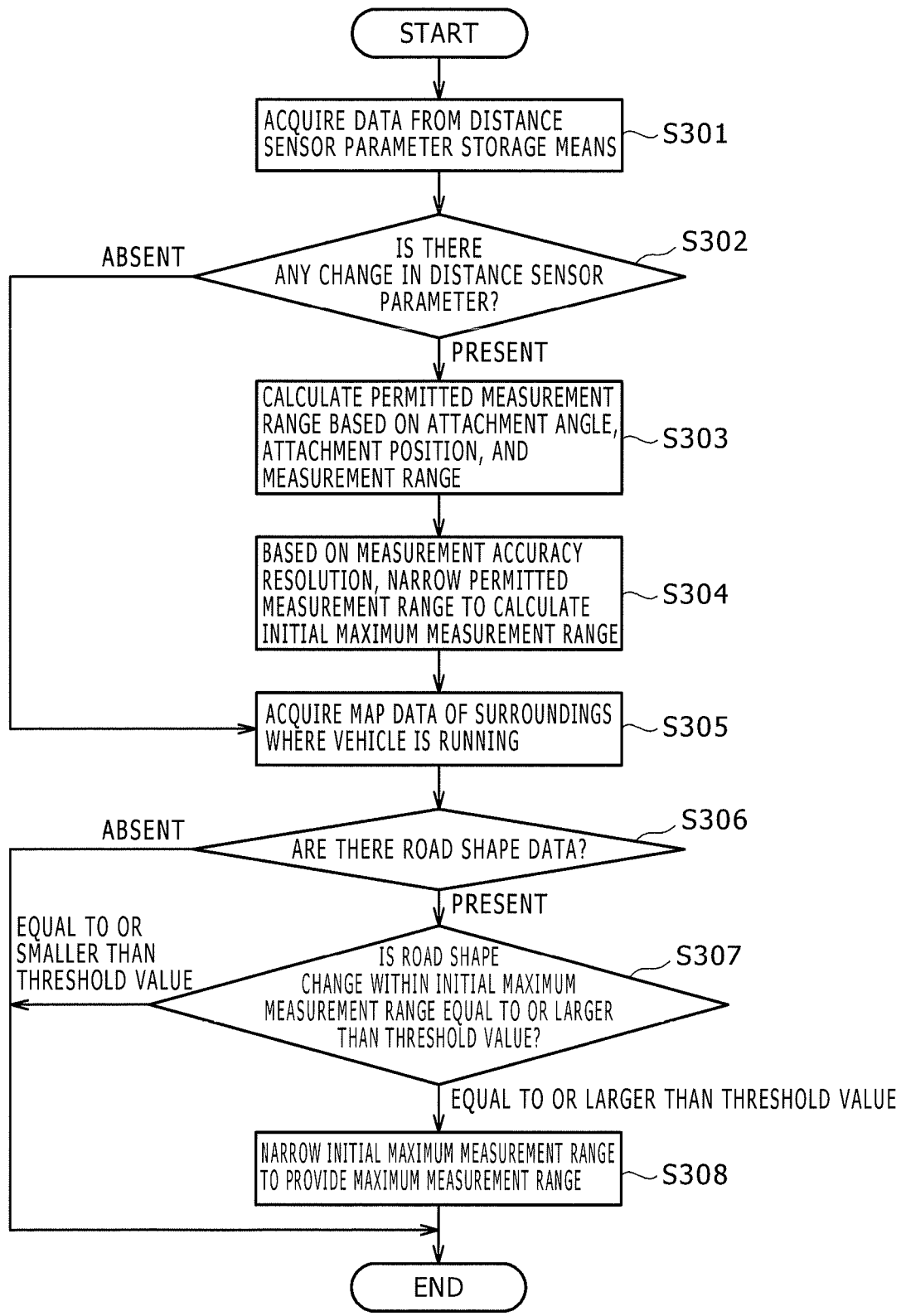
FIG. 3 is a flow chart of processing of determining a maximum measurement range.

Hereinafter, the embodiments of the present invention will be described with reference to the drawings.

FIG. 1 shows an outline of a vehicle control system including a vehicle driving support device using the invention. From a distance sensor 102 such as an LRF or a stereo camera that measures a distance from a self position to an object, distance chronological information is inputted to a driving support device 101. FIG. 2 shows data structure of the distance chronological information. The distance chronological information from the distance sensor 102 includes: a measurement point number 202 as the number of points at which the distance is measured (measurement target points); and measurement target point positions 203 the number of which is equal to the measurement point number. Time provided by an internal clock in the driving support device 101, at which they were inputted is recorded as measurement clock time 201 indicating clock time at which the distance was measured. The measurement target point position 203 is expressed by a coordinate system defined in the distance sensor 102, and is expressed by a three-dimensional coordinate system, (x-axis position, y-axis position, and z-axis position) in the description below. Indication of this measurement target point position can also be expressed by a polar coordinate system (a distance to the measurement target point and a direction of the measurement target point), and essentially indicates the same contents.

Hereinafter, processing in the driving support device 101 will be described.

In the driving support device 101, by a maximum measurement range determination means 110, within a range measured by the distance sensor 102, a maximum measurement range targeted for feature point detection is set, and from the measurement points measured by the distance sensor 102 in this range, a feature point is detected. Referring to FIG. 3, processing of determining the maximum measurement range in the maximum measurement range determination means 110 will be described. This maximum measurement range determination means 110 is activated every time the measurement clock time 201 of the distance chronological information is updated.

Figure 6:
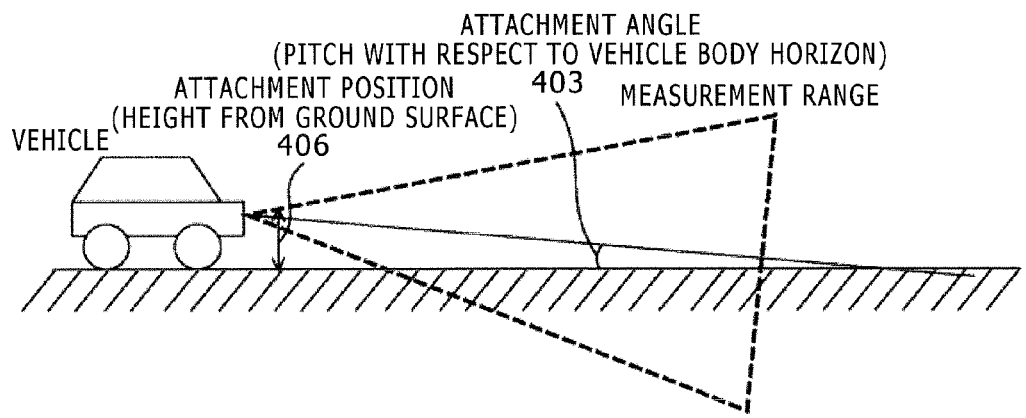
FIG. 6 is a diagram illustrating the distance sensor parameters.
Figure 7:
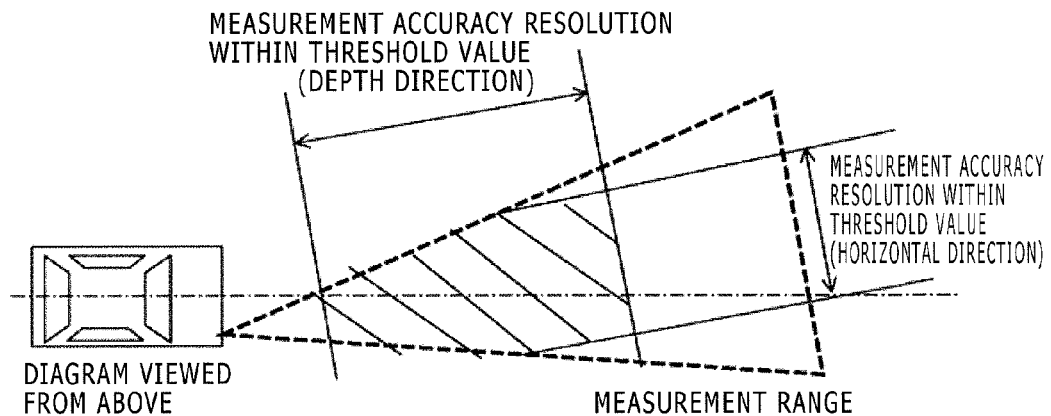
FIG. 7 is a diagram illustrating narrowing of the maximum measurement range.
Figure 8:
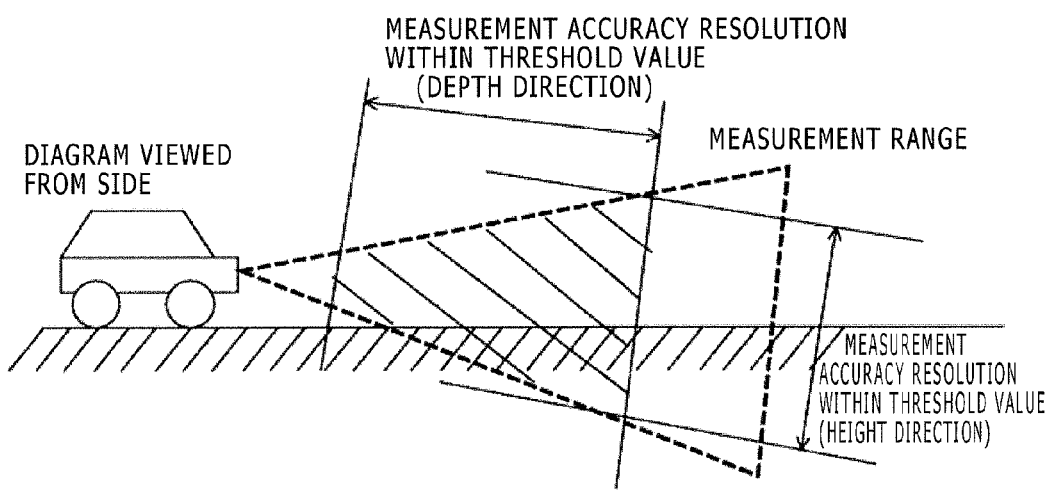
FIG. 8 is a diagram illustrating narrowing of the maximum measurement range.

First, in step S301, the driving support device 101 acquires data of distance sensor parameters from a distance sensor parameter storage means 103. FIG. 4 shows data structure of the distance sensor parameters stored in this distance sensor parameter storage means 103. Moreover, FIGS. 5 and 6 show conceptual diagrams of the main parameters. Stored in the distance sensor parameter storage means 103 are: a parameter change flag 401 indicating presence or absence of a change, i.e., whether or not the distance sensor parameter was changed; and the other main parameters including attachment angles, attachment positions, measurement accuracy resolutions, and measurement ranges. Saved as the attachment angles of the distance sensor 102 are: a roll angle 402 and a pitch angle 403 with reference to a case where a vehicle body is oriented horizontally; and a yaw angle 404 for a wheel axis. Moreover, saved as the attachment positions of the distance sensor are: a horizontal shift amount 405 with respect to a vehicle body axis and a height 406 from the ground. Further saved for the measurement accuracy resolutions of the distance sensor to be used are values of: a depth direction 407, a horizontal direction 408, and a height direction 409. Similarly saved as the measurement ranges of the distance sensor are values of: a depth direction 410, a horizontal direction 411, and a height direction 412. Saved as initial values of the distance sensor parameters are: values obtained from different specifications of the distance sensor 102, and values of the measured attachment positions and the measured angles.

Next, in step S302, based on the value of the parameter change flag 401 of the distance sensor parameters acquired from the distance sensor parameter storage means 103, it is judged whether or not the parameter value has been changed. If the parameter value has been changed, the attachment angle of the distance sensor 102 with respect to the vehicle and the initial maximum measurement range determined based on the specified values of the distance sensor also change, and thus the processing proceeds to step S303 in order to calculate the initial maximum measurement range again. If the parameter value has not been changed, there is no need of calculating the initial maximum measurement range again, and thus the processing proceeds to step S305.

In step S303, the attachment angles and the attachment positions are calculated from the distance sensor parameters acquired in step S301, and a range permitted for distance measurement by the target distance sensor 102 is calculated based on a value of the measurement range. The permitted measurement range can be obtained by (formula 1) below.

$$\begin{cases} d = \dfrac{Hv}{\tan\phi} & \dots \quad (\phi > 0) \\ d = D & \dots \quad (\phi \le 0) \end{cases}$$ [Formula 1]

$$w = \dfrac{W \cdot d}{D}$$

$$h = \dfrac{H \cdot d}{D}$$

Here, "d" denotes the permitted measurement range (depth direction), "w" denotes the permitted measurement range (horizontal direction), "h" denotes the permitted measurement range (height direction), "Hv" denotes the attachment position (height from the ground), $\phi$ denotes the attachment angle (pitch angle), "D" denotes the permitted measurement range (depth direction), "W" denotes the measurement range (horizontal direction), and "H" denotes the measurement range (height direction).

Next, in step S304, based on the measurement accuracy resolutions of the distance sensor parameter acquired in step S301, a range in which the measurement accuracy can be kept in the permitted measurement range is calculated. This range in which the measurement accuracy can be kept is a region in which the measurement accuracy resolutions of the depth direction, the horizontal direction, and the height direction fall within threshold values of the measurement accuracy inside the range of the measurement by the distance sensor, and this region is stored as an initial maximum measurement range. The measurement accuracy resolution denotes an interval between measurement points at a point distant from the vehicle by a given distance, and has values for the depth, the horizontal direction, and the height direction, respectively. To keep the measurement accuracy, condition (interval between the measurement points) (size of an object targeted for the measurement) needs to be satisfied, and thus the maximum measurement range can be expressed as follows.

$$\begin{cases} d_{max} = \dfrac{L \cdot O}{rd} & \dots \quad \left(d > \dfrac{L \cdot O}{rd}\right) \\ d_{max} = d & \dots \quad \left(d \le \dfrac{L \cdot O}{rd}\right) \end{cases}$$ [Formula 2]

$$\begin{cases} w_{max} = \dfrac{L \cdot O}{rw} & \dots \quad \left(w > \dfrac{L \cdot O}{rw}\right) \\ w_{max} = w & \dots \quad \left(w \le \dfrac{L \cdot O}{rw}\right) \end{cases}$$

$$\begin{cases} h_{max} = \dfrac{L \cdot O}{rh} & \dots \quad \left(h > \dfrac{L \cdot O}{rh}\right) \\ h_{max} = h & \dots \quad \left(h \le \dfrac{L \cdot O}{rh}\right) \end{cases}$$

Here, $d_{max}$, $w_{max}$ and $h_{max}$ respectively denote the maximum measurement range (depth direction), the maximum measurement range (horizontal direction), and the maximum measurement range (height direction), "rw", "rh", and "rd" respectively denote the resolution (horizontal direction), the resolution (height direction), and the resolution (depth direction) when separation by a distance L is done, and O denotes a minimum dimension of the measurement target object.

The maximum measurement range obtained in this manner is stored as the initial maximum measurement range.

Next, in step S305, map data of the surroundings at which the own vehicle runs is acquired from a map database 104, and in step S306, it is judged whether or not there is road shape data in the map data including a road on which the own vehicle runs. Here, the road shape data is defined as, for example, curvature data or gradient data. If there is the road shape data, the processing proceeds to step S307, and if there is no road shape data, the initial maximum measurement range is stored as the maximum measurement range and the processing ends.

Next, in step S307, it is judged whether or not there is any point whose value of change in the road shape data within the initial maximum measurement range calculated in step S304 is equal to or larger than a threshold value. The value of change in the road shape data is a difference between a value of the road shape data at a given point at the surroundings of the own vehicle and a value of the road shape data at a given point therebeyond. If the value of change in the road shape data within the initial maximum range is equal to or smaller than the threshold value, the initial maximum measurement range is stored as the maximum measurement range and the processing ends. Moreover, if the value of change in the road shape data is equal to or larger than the threshold value, a point at which it becomes equal to or larger than the threshold value is defined as a point of change in the road shape, distances (horizontal, height, and depth) to this point of change are stored, and the processing proceeds to step S308.

Figure 9:
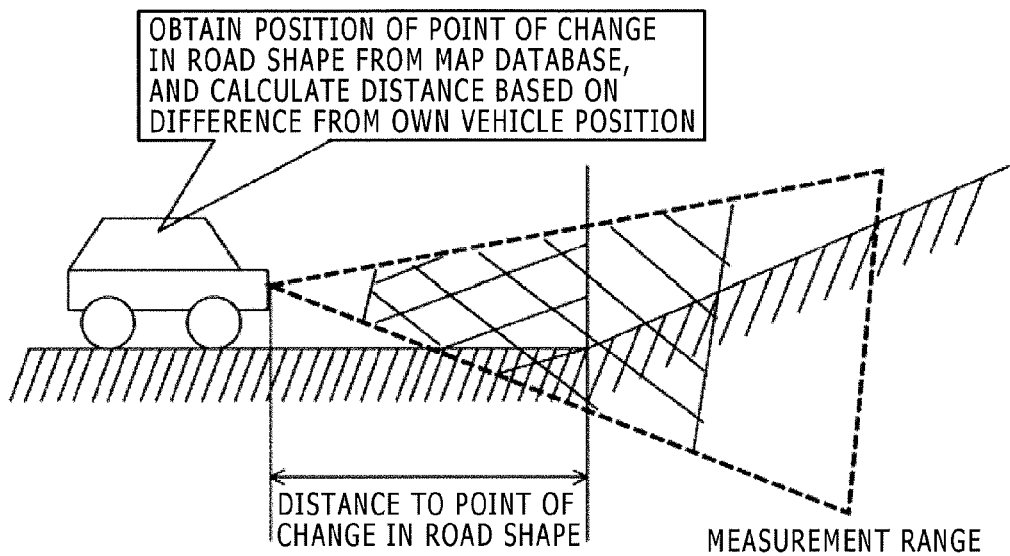
FIG. 9 is a diagram illustrating narrowing of the maximum measurement range based on a road shape.

In step S308, the measurement range is narrowed down to the point of change in the road shape and stored as the maximum measurement range. If the object measured by the distance sensor is located at a place where the road shape changes, it is viewed differently at front and back of the point of change in the road shape with high possibility, which contributes to erroneous detection and an error. Thus, objects located before the point of change in the road shape when viewed from the own vehicle are not observed. As shown in FIG. 9, the measurement range obtained by narrowing the point of change in the road shape is stored as the maximum measurement range and the processing ends.

Figure 10:
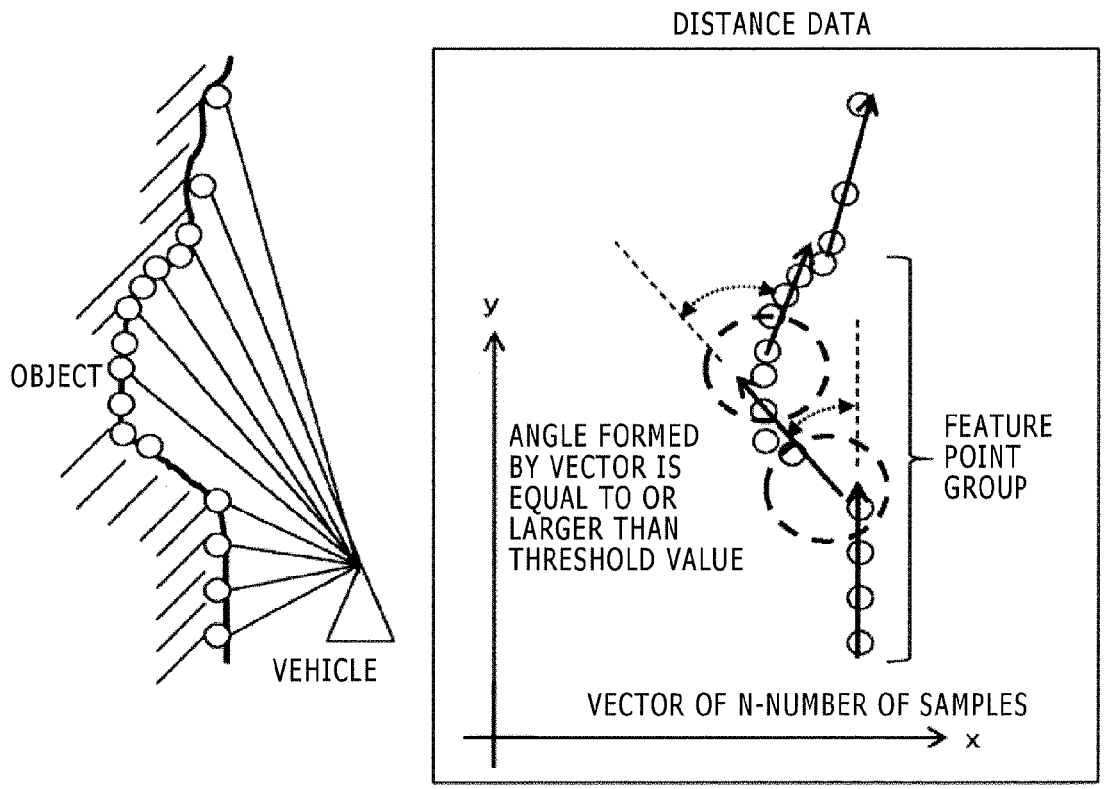
FIG. 10 is a diagram illustrating measurement by the distance sensor.

In the feature point detection means 111, a feature point in the set maximum measurement range is detected. By using the distance chronological information inputted from the distance sensor 102, based on relative positional relationship with each measurement point on the object surface at the surroundings of the vehicle measured at time t by the distance sensor 102, a group of the measurement points as the feature points of the object (feature point group) is detected. FIG. 10 shows a conceptual diagram for the detection of the feature point group. At given time t, measured positions of a plurality of measurement points are respectively projected onto an xy plane, a yz plane, and a zx plane. On each projected plane, by use of a least square method with the plurality of points as one unit, a vector formed by its point sequence is calculated. The plurality of points subject to the vector calculation here may be an aggregate of a predetermined number of adjacent points on each projected plane or an aggregate of points within a predetermined distance. If an angle formed by adjacent vectors is equal to or larger than a given value, it is recognized as a portion serving as the feature points, and all the point sequences forming the both vectors, as the feature point group, are stored into a feature point initial position saving means 112 together with measurement time of the measurement point. This processing is performed for all the measurement points within the maximum measurement range every time the distance from the object is measured in the distance sensor 102.

Figure 11:
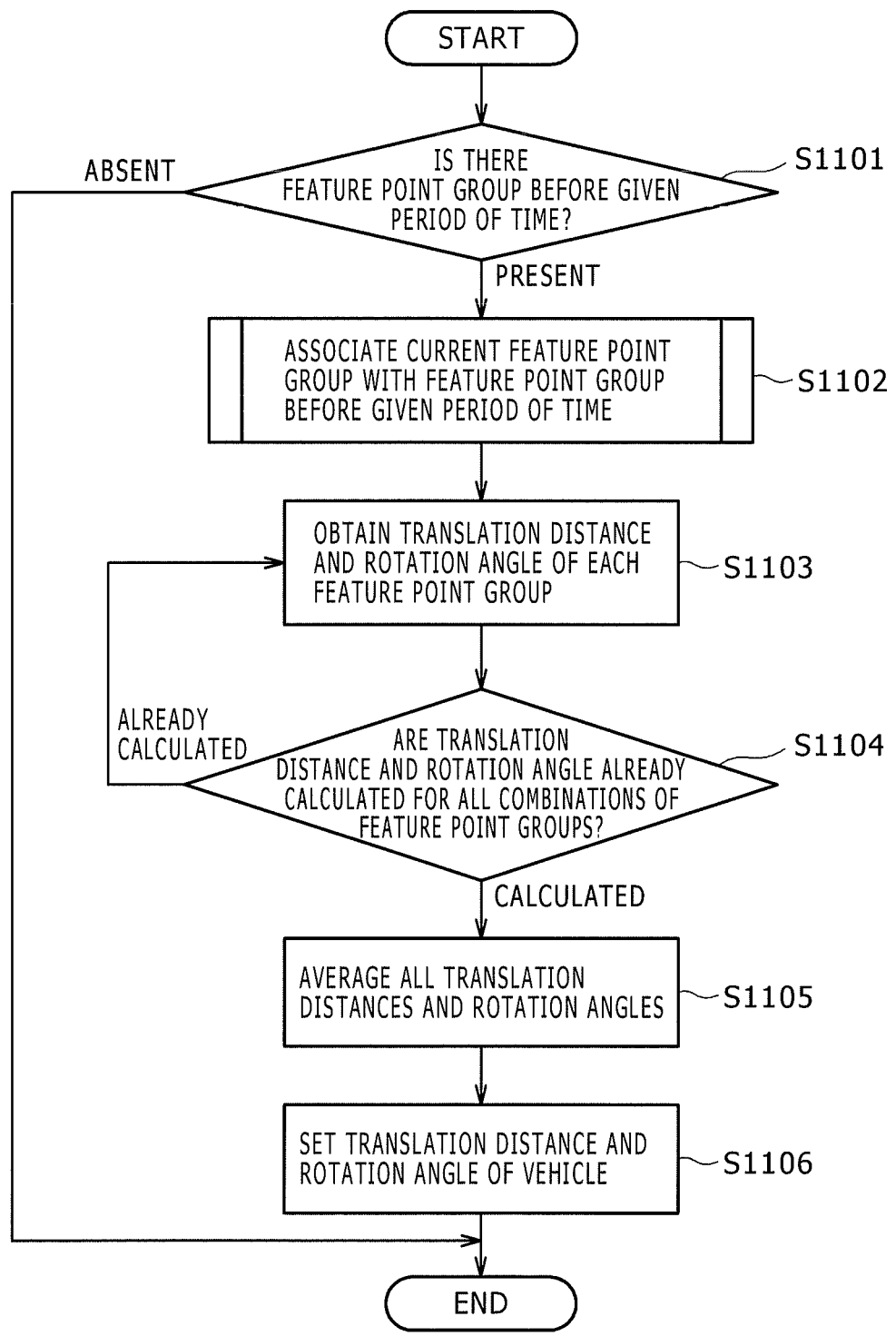
FIG. 11 is a flow chart of processing of calculating a translational distance and a rotation angle.

Next, in a vehicle translation and rotation angle calculation means 113, changes in translation and rotation of the vehicle are calculated. The vehicle translation and rotation angle calculation means 113 calculates the translation and the rotation angle of the vehicle by processing in a flow chart of FIG. 11. First, in step S1101, it is judged whether or not there is a feature point group before a given period of time in the feature point initial position saving means 112. If there is none, the processing ends without the calculation of the translation and the rotation angle.

If there is a feature point group before the given period of time, the processing proceeds to step S1102, in which it is compared with the current feature point group and they are associated with each other. For the association of the feature point groups, a correlation coefficient $\rho$ between the feature point groups between the feature point group before the given period of time and the current feature point group is calculated and the feature point groups with the highest correlation are defined as the feature point groups associated with each other. The correlation coefficient $\rho$ is obtained by using (Formula 3) below.

$$\rho = \frac{E(x-E(x))(y-E(y))}{\sqrt{E(x-E(x))^2 \cdot E(y-E(y))^2}}. \qquad \text{[Formula 3]}$$

Here, "x" denotes the current feature point group (vector), "y" denotes the feature point group (vector) before the given period of time, and E ( ) denotes an expected value.

Figure 12:
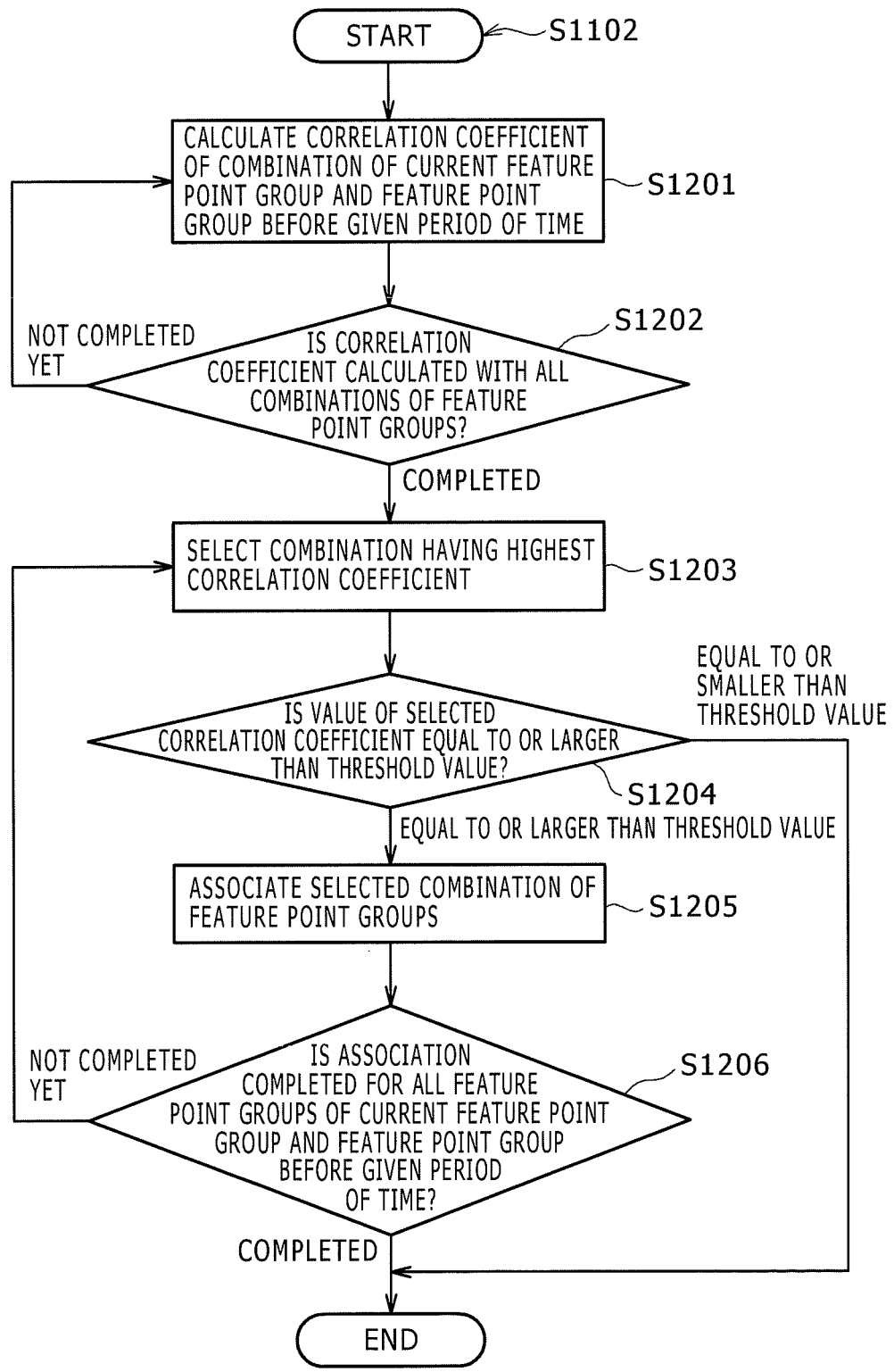
FIG. 12 is a flow chart of processing of associating feature point groups.

FIG. 12 shows a flow chart of the processing of performing this association of the feature point groups in step S1102. First, in step S1201, the correlation coefficient $\rho$ between the feature point groups between the feature point group before the given period of time and the current feature point group is obtained. Then in step S1202, it is judged whether or not a correlation coefficient is calculated with all combinations of feature point groups. If there is any combination of feature point groups for which the correlation coefficient has not yet been calculated, the processing returns to step S1201, and processing of obtaining the correlation coefficient for any combination of feature point groups for which the correlation coefficient has not yet been calculated is repeated.

Next, in step S1203, of the combinations of feature point groups which have not yet been associated, the combination of feature point groups with the highest correlation coefficient is selected. Next, in step S1204, it is judged whether or not a value of the highest correlation coefficient for the feature point groups which have been associated is larger than a threshold value. If it is equal to or smaller than the threshold value, judging that there is no other combination of feature point groups which have been associated, the processing ends. If it is equal to or larger than the threshold value, association is made for the combination of feature point groups selected in step S1205. Next, in step S1206, it is checked if all the feature point groups of at least one of the current feature point group and the feature point group before the given period of time are associated. If the feature point groups are associated for all the feature point groups of at least one of the current feature point group and the feature point group before the given period of time have been associated, judging that association is made for all the feature point groups, the processing ends. If there is any remaining feature point group, the processing returns to step S1203, and the combination of feature point groups with the next highest value of correlation coefficient is selected and the processing is repeated.

Returning to FIG. 11, through the aforementioned processing of associating the feature point groups, a translation distance and a rotation angle are obtained for the determined combination of feature point groups (S1103).

Figure 13:
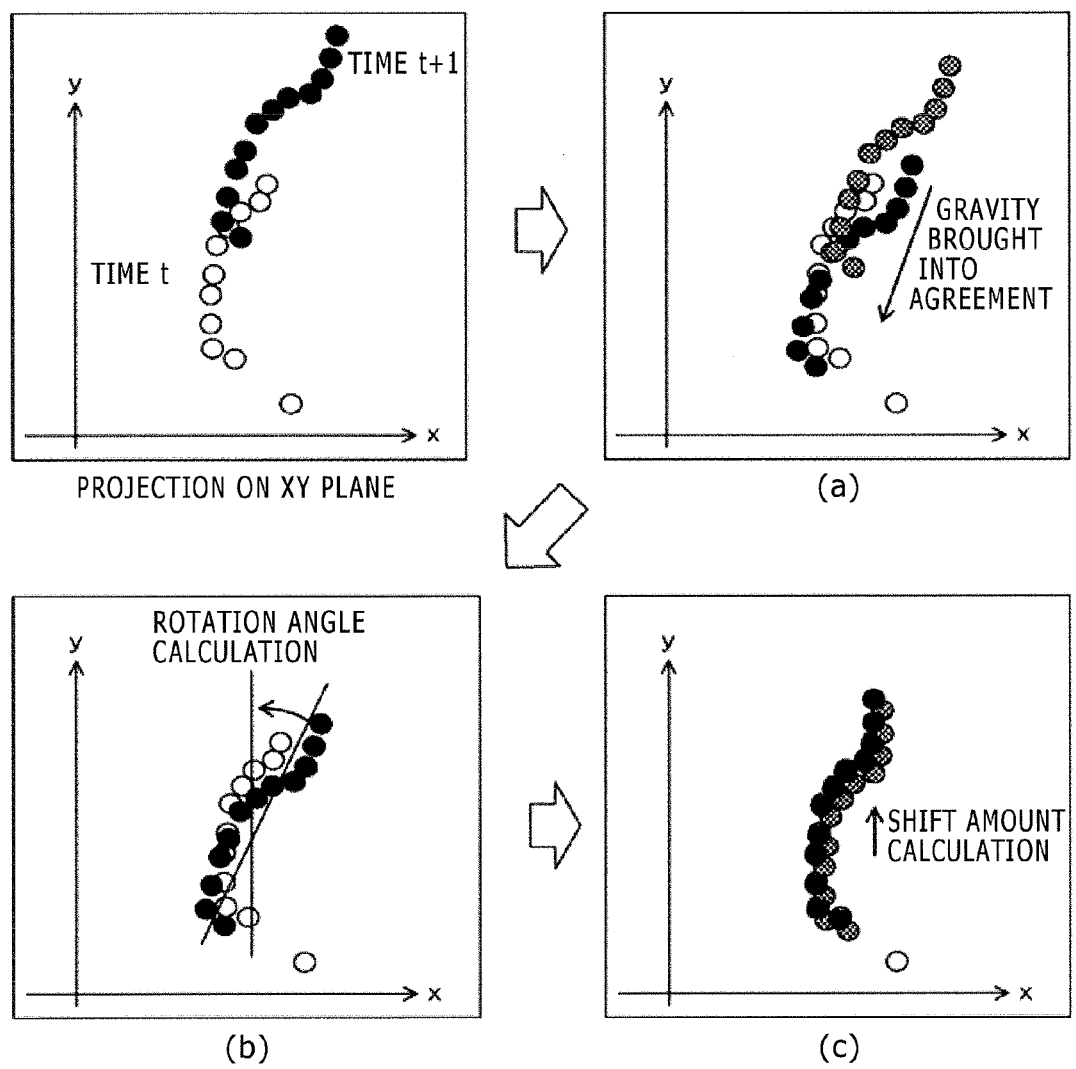
FIG. 13 is a diagram illustrating calculation of the translational distance and the rotation angle.

Referring to FIG. 13, processing of obtaining the translation distance and the rotation angle will be described. First, as shown in (a) of FIG. 13, stored for the current feature point group and the feature point group before the given period of time which are associated is a shift amount of a median point when a median point of projection points for projection of the measurement points forming the current feature point group on respective planes is brought into agreement with a median point of the feature point group before the given period of time obtained in the same manner. Next, as shown in (b) of FIG. 13, the current feature point group is rotated around its median point, the rotation angle whose shape is closest to that of the feature point group before the given period of time is calculated by a least square method, and this rotation angle is stored. Next, as shown in (c) of FIG. 13, such a parallel shift amount that minimizes a difference between the projection points of the measurement points of the current feature point group and the feature point group before the given period of time that are rotated through the rotation angle is obtained by a least square method and added together with a shift amount of the median point to obtain a translation distance.

Then in step S1104, it is judged whether or not the aforementioned processing of obtaining the translation distance and the rotation angle has been performed for all the combinations of feature point groups. If the processing has been completed for all the combinations, the processing proceeds to step S1105. If the operation has not yet been completed, the processing returns to step S1103, and the processing of obtaining the translation distance and the rotation angle is repeated for the unprocessed combinations.

Next, in step S1105, respective average values of the translation distance and the rotation angle obtained for each combination of feature point groups are obtained, and in step S1106, these averages values are set as a translation distance and a rotation angle of the vehicle.

In the driving support device 101, outputs are regularly received from the gyro 105 and the acceleration sensor 106, an output value of the gyro 105 is subjected to addition and converted into rotation angle data and an output value of the acceleration sensor 106 is subjected to addition and converted into translation distance data in a sensor addition means 114. Note that output cycles of the gyro 105 and the acceleration sensor 106 do not necessarily have to agree with an output cycle of the distance sensor 102.

The output value of the acceleration sensor 106 is also affected by gravity acceleration, and thus the vehicle posture is calculated by using, for example, the same technology as that of Patent Literature 1 and the effect of the vehicle posture on the gravity acceleration is eliminated, conversion into speed data is performed, and the speed data is subjected to addition to thereby perform conversion into translation distance.

After the rotation angle data and the translation distance are calculated based on the output value of the sensor, in the sensor parameter estimation means 115, parameters of the gyro 105 and the acceleration sensor 106 are estimated. The translation distance and the rotation angle of the vehicle calculated by the vehicle translation and rotation angle calculation means 113 by using output data of the distance sensor 102 can be compared with the translation distance data and the rotation angle data calculated in the sensor addition means 114 to thereby calculate a speed difference and an angle difference. The calculated speed difference and angle difference are divided by current clock time and a clock time difference obtained through the comparison between the translation distance data and the rotation angle data to calculate the acceleration difference and the angular speed difference. These differences are an acceleration difference and an angular speed difference per time. The acceleration difference is affected by noise of the acceleration sensor and bias of the acceleration sensor, and thus assuming that the noise of the acceleration sensor is white noise, the bias of the acceleration sensor 106 can be estimated by a Kalman filter.

As described above, distance displacement and angle displacement obtained in the sensor addition means 114 by using the bias value estimated in the sensor parameter estimation means 115 are corrected, and a position is estimated in a position estimation means 116. The Kalman filter is used for the position estimation, and position difference covariance is simultaneously obtained. The estimated position and difference covariance are outputted from the driving support device 101 to the vehicle controller 107.

The vehicle controller 107, upon detection that the difference covariance outputted from the driving support device 101 increases and a range in which the own vehicle position is present is widening, judges that certainty of the own vehicle position deteriorates, and performs control in a manner such as to reduce a vehicle speed to an appropriate speed.

The present invention described above has been made for the embodiments, but the invention is not limited thereto, and it is clear to those skilled in the art that various modifications can be made according to spirits of the invention and an accompanying scope of the claims.

LIST OF REFERENCE SIGNS

101 Driving support device
102 Distance sensor
106 Acceleration sensor
107 Vehicle controller
110 Maximum measurement range determination means
115 Sensor parameter estimation means
116 Position estimation means

The invention claimed is:

1. A driving support device including: a sensor measuring a change in posture or a moving speed of a vehicle; and a distance measurement means adapted to measure a distance to an object at surroundings of the vehicle, and outputting a specified vehicle position relative to the object, the driving support device comprising:
 a storage means adapted to store distance sensor parameters of the distance measurement means, wherein the distance sensor parameters include at least an angle of attachment of the distance measurement means to the vehicle;
 a map database storing land shape information;
 a range determination means adapted to define a range targeted for measurement data processing based on the distance sensor parameters of the storage means and the land shape information of surroundings of a current position already measured;

a feature point detection means adapted to detect a feature point within the range targeted for measurement data processing;

a vehicle translation and rotation angle calculation means adapted to associate the feature point with a previously obtained feature point and obtain a vehicle behavior based on changes in a position and a direction of the feature point;

a sensor parameter estimation processor programmed to estimate a parameter of the sensor based on a measured value of the sensor and the vehicle behavior;

a position estimation means adapted to calculated a position corrected by using the estimated sensor parameter.

2. The driving support device according to claim 1, wherein the range determination means, based on the land shape information of the surroundings of the current position acquired from the map database, defines, as the range targeted for the measurement data processing, a range in which changes in a shape of a road surface including a gradient change is smaller than a predetermined value.

3. The driving support device according to claim 1, wherein deceleration control is performed based on certainty of the vehicle position provided by the position estimation means.

4. A driving support device including: a sensor measuring a change in posture or a moving speed of a vehicle; and a distance measurement means adapted to measure a distance to an object at surroundings of the vehicle, and outputting a specified vehicle position relative to the object, the driving support method comprising:

a range determination processing of defining a range targeted for measurement data processing based on distance sensor parameters of the distance measurement means stored in a storage means and land shape information of surroundings of a current position already measured and stored in a map database;

feature point detection processing of detecting a feature point within the range targeted for the measurement data processing;

vehicle translation and rotation angle processing of associating the feature point and a previously acquired feature point and obtaining a vehicle behavior based on changes in a position and posture of the feature point;

sensor parameter estimation processing of estimating a parameter of the sensor based on a measurement value of the sensor and the vehicle behavior;

position estimation processing of calculating a position corrected by using the estimated sensor parameter; and wherein the distance sensor parameters of the distance measurement means includes at least an angle of attachment of the distance measurement means to the vehicle.

5. The driving support method according to claim 4, wherein in the range determination method, based on the land shape information of the surroundings of the current position acquired from the map database, a range with which changes in a shape of a road surface including a gradient change is smaller than a predetermined value is defined as the range targeted for the measurement data processing.

6. The driving support device according to claim 1, wherein deceleration control is performed based on certainty of the vehicle position provided by the position estimation means.

7. The driving support device according to claim 2, wherein deceleration control is performed based on certainty of the vehicle position provided by the position estimation means.

8. The driving support device according to claim 1, wherein the range determination means, based on the distance sensor parameters, defines, as the range targeted for the measurement data processing, a range in which accuracy of the measurement by the distance measurement means is better than a predetermined accuracy.

9. The driving support method according to claim 4, wherein in the range determination processing, based on the distance sensor parameters, a range in which measurement accuracy in the distance measurement means is better than a predetermined accuracy is defined as the range targeted for the measurement data processing.

* * * * *